United States Patent [19]
Hegler

[11] Patent Number: 6,079,451
[45] Date of Patent: Jun. 27, 2000

[54] INTEGRAL CORRUGATED JACKET PIPE AND METHOD OF PRODUCING THE SAME

[75] Inventor: Ralph Peter Hegler, Bad Kissingen, Germany

[73] Assignee: Bayerische Motoren Werke Aktingesellschaft, Germany; a part interest

[21] Appl. No.: 09/341,077
[22] PCT Filed: Jan. 10, 1998
[86] PCT No.: PCT/EP98/00106
§ 371 Date: Jul. 2, 1999
§ 102(e) Date: Jul. 2, 1999
[87] PCT Pub. No.: WO98/32202
PCT Pub. Date: Jul. 23, 1998

[30] Foreign Application Priority Data
Jan. 14, 1997 [DE] Germany ............... 197 00 916

[51] Int. Cl.$^7$ .................. F16L 11/00; H02G 3/04
[52] U.S. Cl. .............. 138/121; 138/110; 138/156; 138/128; 174/92; 174/724
[58] Field of Search ................ 138/121, 156, 138/110, 163, 162, 166–168, 128, 108; 174/92, 724, 135

[56] References Cited

U.S. PATENT DOCUMENTS

| | | | |
|---|---|---|---|
| 976,060 | 11/1910 | Fulton | 138/128 |
| 3,336,950 | 8/1967 | Fochler | 138/156 X |
| 4,037,626 | 7/1977 | Roberts, Jr. | 138/121 X |
| 4,513,787 | 4/1985 | Hegler | 138/166 |
| 5,126,507 | 6/1992 | Kirma | 138/108 X |
| 5,967,194 | 10/1999 | Martin | 138/156 |
| 6,014,988 | 1/2000 | Gagnon et al. | 138/121 X |

FOREIGN PATENT DOCUMENTS

| | | |
|---|---|---|
| 114213 | 8/1984 | European Pat. Off. . |
| 268869 | 6/1988 | European Pat. Off. . |
| 1203940 | 10/1965 | Germany . |
| 3405552 | 8/1985 | Germany . |

*Primary Examiner*—Patrick Brinson
*Attorney, Agent, or Firm*—Robert F. I. Conte; Lee, Mann, Smith; McWilliams, Sweeney & Ohlson

[57] ABSTRACT

An enveloping corrugated pipe (1) comprises corrugated sections (3) which are disposed one after the other in the direction of the axis (2), extending over more than half its periphery. Further, it comprises corrugated partial sections (3", 3'") which are disposed one within the other, which are turned towards each other and adjoin the ends of the corrugated section (3).

5 Claims, 5 Drawing Sheets

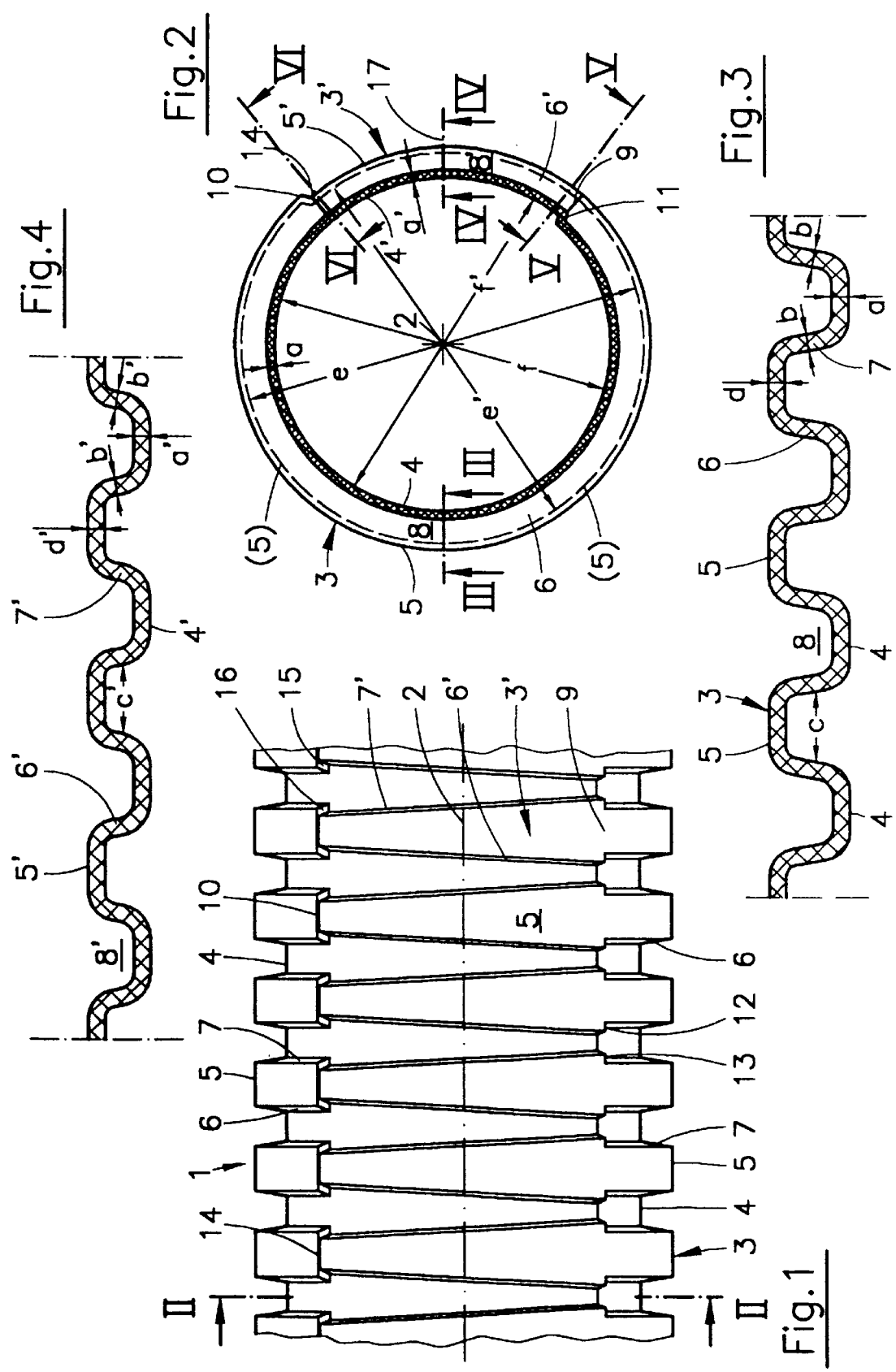

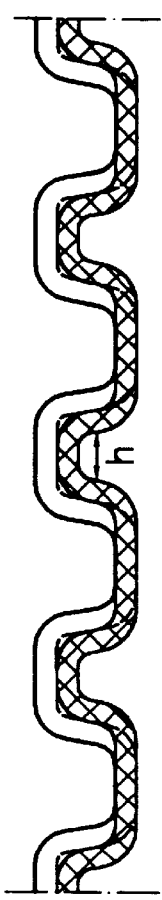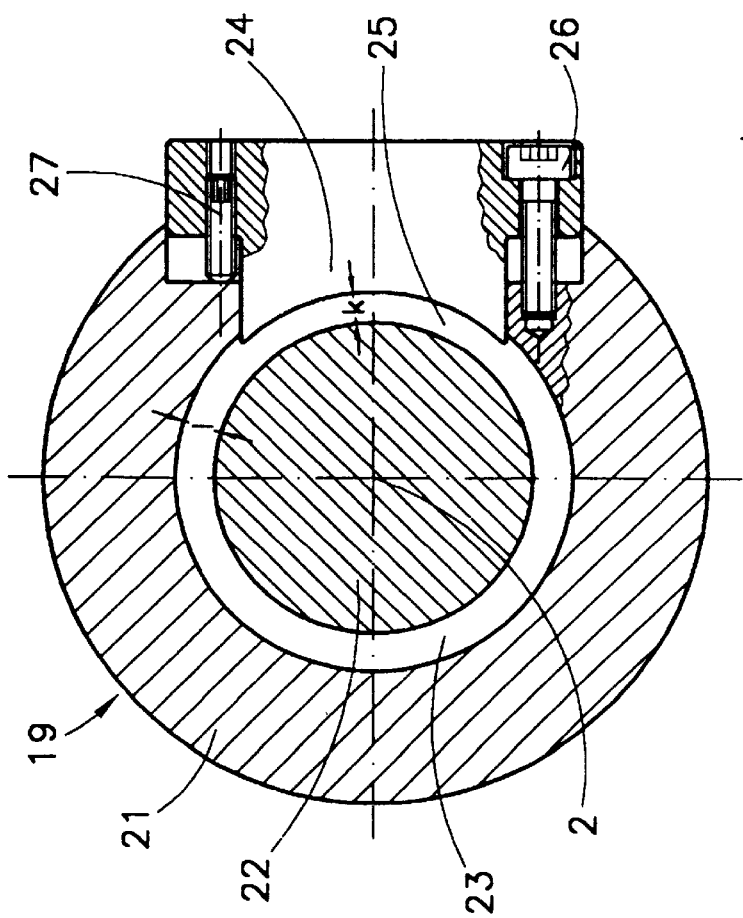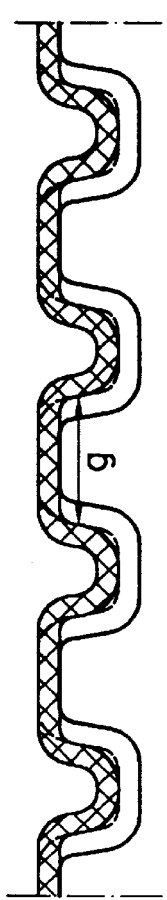

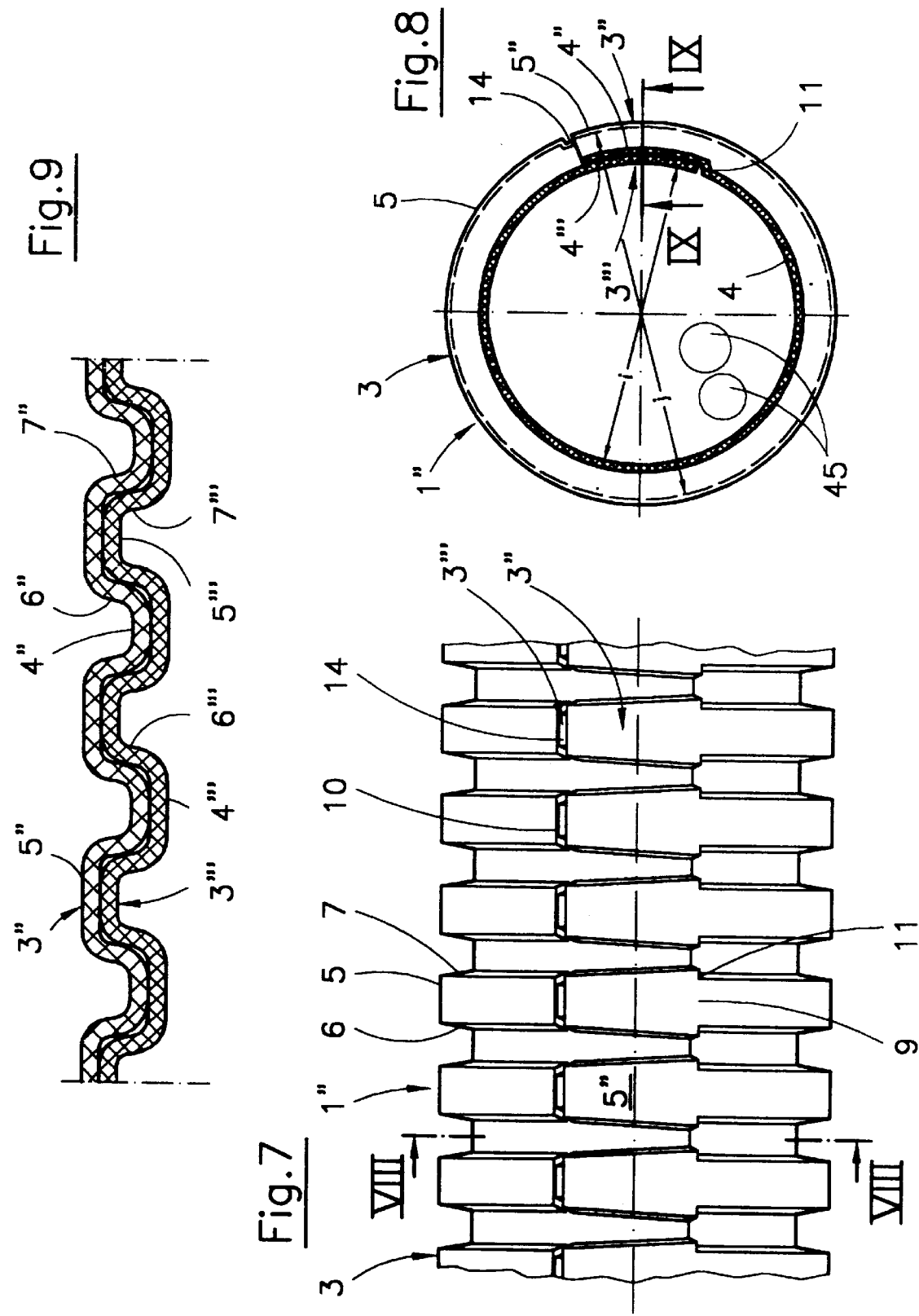

INTEGRAL CORRUGATED JACKET PIPE AND METHOD OF PRODUCING THE SAME

The invention relates to a one-piece enveloping corrugated pipe and a method for the manufacture of same. Enveloping corrugated pipes of the generic type serve, among other purposes, for the protection of electric lines in the automotive industry.

EP 0 114 213 A (corresponding to U.S. Pat. No. 4,513,787) teaches an enveloping corrugated pipe of plastic material which has a lateral longitudinal slit and, along this longitudinal slit, is provided with a locking or snap-in closing mechanism detachably connecting the two edges of the slit. This envloping corrugated pipe can be produced without any problem technologically; a disadvantage resides in the fact that the closed enveloping corrugated pipe, i.e. with its snap-in locking mechanism closed, has a preferred bending direction which is perpendicular to the axis of the pipe so that it can be opened when bent.

A lengthwise slit enveloping corrugated pipe is known from EP 0 291 418 A, which is provided with radially projecting webs in the vicinity of its longitudinal slit, a locking sleeve being pushed over the webs. This is not a one-piece enveloping corrugated pipe, and as a two-piece pipe it is difficult to mount. At right angles to the axis of the pipe, it has a preferred bending direction which is of disadvantage when the pipe is placed.

A one-piece enveloping corrugated pipe which has a longitudinal slit is known from WO 94/11663. In the vicinity of the slit, the corrugated section is provided, on one side of the slit, with a locking projection, to which a locking recess on the corrugated section is allocated on the other side of the longitudinal slit. The manufacture of such an enveloping corrugated pipe is rather complicated, the more so since the locking parts have to be worked mechanically after extrusion.

A two-piece enveloping corrugated pipe is known from EP 0 268 869 B 1, consisting of two pipe sections which each have tapered corrugated sections. Mounting these two pipe sections is difficult. After the assembly, the tapered corrugated sections rest within the corrugated sections not tapered. Manufacture and mounting are complicated; however the disadvantages of the slit corrugated pipes described above can thus be avoided.

It is the object of the invention to embody a one-piece enveloping corrugated pipe of simple structure and to specify a method that can easily be put into practice.

In a one-piece enveloping corrugated pipe, this object is attained by the features of claim 1. The two corrugated partial sections lie radially one upon the other and mesh, this producing proper interlocking in the vicinity of the divide, i.e. of a cutting plane. This provides for reliable splash protection.

The development according to claim 2 helps ensure that the enveloping corrugated pipe has no or only a negligible preferred bending direction. The further development according to claim 3 ensures that superposed corrugated partial sections cannot be pulled apart in the peripheral direction. So interlocking is available also in the peripheral direction. This interlocking also works when the pipe is bent, it being precluded during the bending of a pipe that the meshing corrugated partial sections are pulled apart in the peripheral direction. The further development according to claim 4 helps prevent the presence of sharp edges inside the enveloping corrugated pipe which might lead to damages of the electric lines disposed in the enveloping corrugated pipe. The further development according to claim 5 ensures that the corrugated pipe does not have any projections or sharp edges externally either.

Further advantages and features of the invention will become apparent from the ensuing description of an exemplary embodiment of the invention, taken in conjunction with the drawing, in which FIG. 1 is a lateral longitudinal view of a corrugated pipe that constitutes an intermediate product;

FIG. 2 is a cross-section through the corrugated pipe corresponding to the section line II—II of FIG. 1;

FIG. 3 is a cross-section through the corrugated pipe corresponding to the section line III—III of FIG. 2;

FIG. 4 is a cross-section through the corrugated pipe corresponding to the section line IV—IV of FIG. 2;

FIG. 5 is a cross-section through the corrugated pipe corresponding to the section line V—V of FIG. 2;

FIG. 6 is a cross-section through the corrugated pipe corresponding to the section line VI—VI of FIG. 2;

FIG. 7 is a lateral lengthwise view of the corrugated pipe in the finished mounted condition;

FIG. 8 is a cross-section through the corrugated pipe corresponding to the section line VIII—VIII of FIG. 7;

FIG. 9 is a cross-section through the corrugated pipe corresponding to the section line IX—IX of FIG. 8;

FIG. 11 is a section through the extrusion die of an extruder corresponding to the section line XI—XI of FIG. 10;

Figure 10:
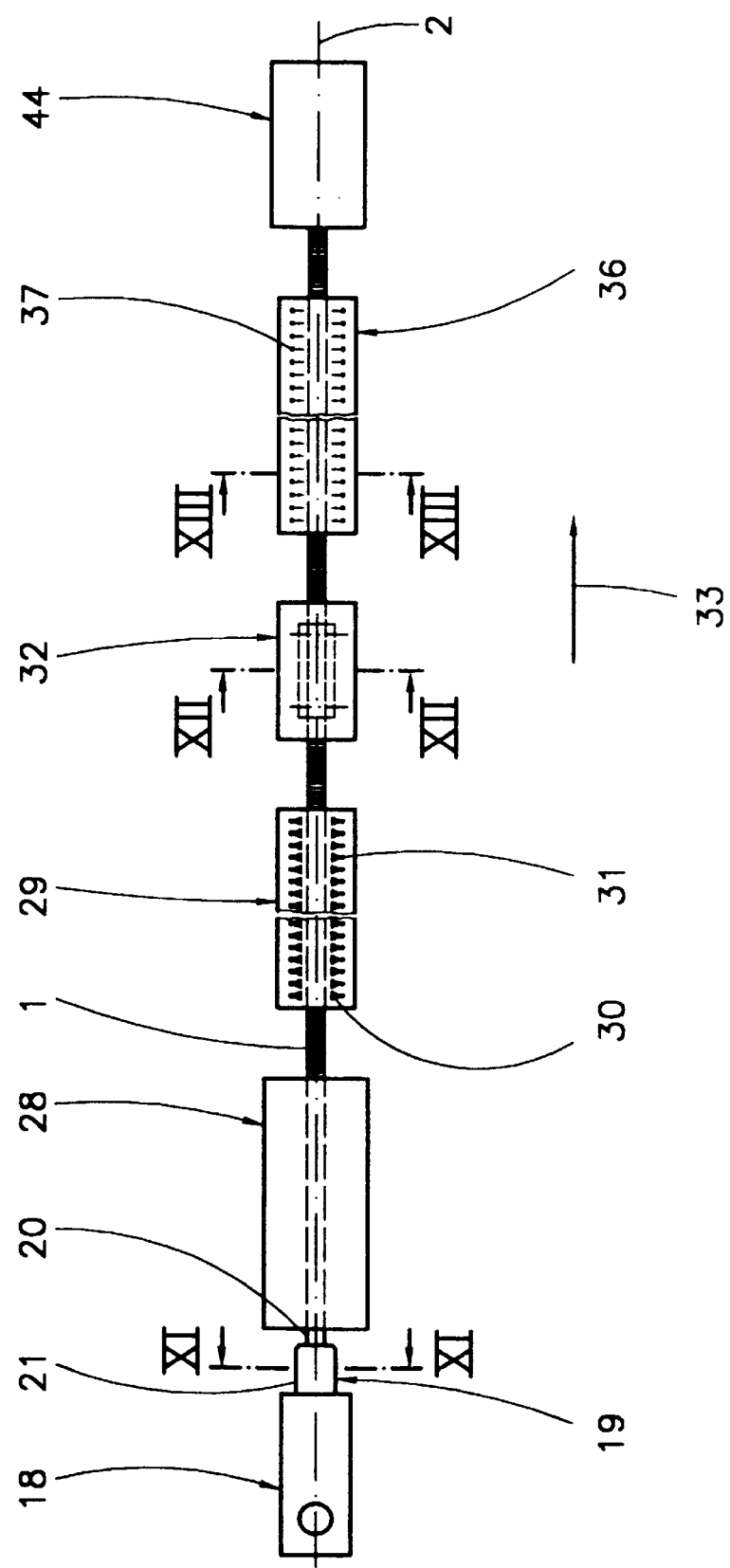
FIG. 10 is an illustration of an installation for the manufacture of a corrugated pipe according to FIGS. 1 to 9.
Figure 13:
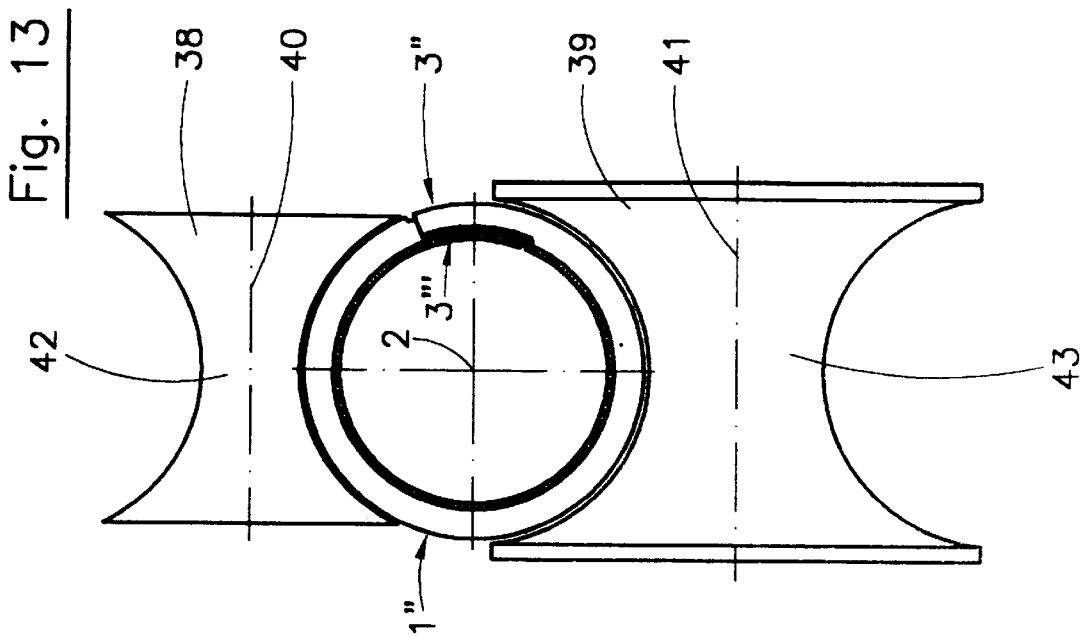
FIG. 13 is a section through a postforming device corresponding to the section line XIII—XIII of FIG. 10.

The corrugated pipe 1 seen in FIGS. 1 to 6 consists of known thermoplastic plastics, for instance polyethylene, polypropylene, polyamide or the like. It has a central longitudinal axis 2, concentrically of which the corrugated pipe 1 is provided with corrugated sections 3, which extend approximately over three quarters of the periphery as seen in FIG. 2. These corrugated sections 3 comprise substantially circular cylindrical inner pipe sections 4 of a wall thickness a, which extend concentrically of the axis 2, and substantially circular cylindrical outer pipe portions 5 of a wall thickness d, which are likewise concentric of the axis 2. An inner pipe section 4 is connected with the neighboring outer pipe portions 5 by way of flanks 6, 7 of a wall thickness b. The flanks 6, 7 joined to the outer pipe portion 5 slightly incline towards each other, seen from the axis 2 radially outwards, so that a cavity 8 forms between an outer pipe portion 5 and the flanks 6, 7 adjoining the latter, the cavity 8—seen from the axis 2—standing back radially outwards relative to the inner pipe sections 4 and in cross-section having approximately the shape of a trapezoid that expands towards the pipe portion 5, as seen in FIG. 3. This design of a corrugated pipe 1, seen in FIG. 2 top, bottom and left, is known and general practice.

As becomes apparent from FIGS. 1, 2, and 4, the corrugated pipe 1 comprises corrugated sections 3' over about one quarter of its periphery, which likewise have inner pipe sections 4' that continue the inner pipe sections 4 and close same over the periphery, outer pipe portions 5' that continue the outer pipe portions 5 and close same over the periphery and flanks 6' and 7' that join the inner pipe sections 4' to the outer pipe sections 5'. The cross-section of the cavity 8' formed in the corrugated section 3' changes over the pheripheral extension of the corrugated section 3'.

The corrugated sections 3' have a begin 9 seen at the lower right in FIG. 1 and in FIG. 2, which corresponds to an end of the corrugated section 3. The corrugated section 3' further comprises an end 10 seen in FIG. 1 top and at the upper right in FIG. 2, which corresponds to the other end of the corrugated section 3. At the begin 9, the outer pipe portion 5 of a corrugated section 3 passes steadily into the outer pipe portion 5' of the corrugated section 3' as becomes apparent from FIGS. 1, 2 and 5. As opposed to this, the inner pipe section 4' is misaligned relative the inner pipe section 4 radially to the axis 2 outwards by the wall thickness a' of the inner pipe section 4'. The flanks 6' and 7' of the corrugated section 3' are displaced in the axial direction relative to the flanks 6, 7 of the adjoining corrugated section 3, namely by about the wall thickness b' of the flanks 6', 7' in the direction of the axis 2, so that at the begin 9, the mean axial extension c' of the respective cavities 8' exceeds the mean axial extension c of the cavities 8 by about double the wall thickness b'. The inner pipe section 4' passes into the inner pipe section 4 by way of a transition section 11; the flanks 6' and 7' pass into the flanks 6 and 7, respectively, by way of transition sections 12, 13.

At the end 10 of the corrugated sections 3', the inner pipe section 4' of same passes continuously into the adjoining inner pipe section 4 of the adjoining corrugated section 3, as seen in FIGS. 2 and 6. As opposed to this, the outer pipe portion 5' stands back radially inwards relative to the adjoining pipe portion 5, namely about by the wall thickness d' of the outer pipe portion 5'. So, the inside diameter of the outer pipe portion 5 decreases from a dimension e, which corresponds also to the inside diameter of the outer pipe portion 5, to a dimension e' at the end 10, $e' \approx e-d'$ applying. Correspondingly—as becomes apparent from the foregoing description—the inside diameter of the inner pipe section 4' increases from a dimension f at the end 10, which corresponds to the inside diameter of the inner pipe sections 4, to a dimension f' at the begin 9, $f' \approx f+a'$ applying. At the end 10, the outer pipe portion 5' passes into the adjoining outer pipe portion 5 by way of a transition section 14 that extends outwards. Further, the flanks 6' and 7' pass into the flanks 6, 7 by way of transition sections 15, 16. At the transition section 11, the corrugated section 3', and consequently the corrugated partial section 3", has an inner axial extension g which exceeds the axial extension c of the corrugated section 3. $g \approx c+2b'$ applies. Correspondingly, $h \approx c-2b'$ applies to the inner axial extension h of the corrugated section 3 and thus to the corrugated partial section 3''' at the transition section 14, i.e. the axial extension h is less than c. The mean axial extension c' is the mean value of g+h.

When the corrugated pipe 1 is cut up unilaterally in the middle between the begin 9 and the end 10 of the corrugated sections 3' in a cutting plane 17 that coincides with the section line IV—IV of FIG. 2 and also runs through the axis 2, then two corrugated partial sections 3" and 3''' are formed from a corrugated section 3', the corrugated partial section 3" extending from the begin 9 to the cutting plane 17 and the corrugated partial section 3''' extending from the cutting plane 17 to the end 10. Correspondingly, the corrugated partial section 3" comprises an inner partial pipe section 4", an outer partial pipe portion 5" and partial flanks 6" and 7". The corrugated partial section 3''' correspondingly comprises an inner partial pipe section 4''', an outer partial pipe section 5''' and partial flanks 6''' and 7'''. When the corrugated pipe 1 cut through in the cutting plane 17 is bent together—as seen in FIGS. 7 to 9—then the corrugated outer partial section 3", by reason of the design specified of the corrugated sections 3', houses the corrugated inner partial section 3''' in such a way that the inner partial pipe sections 4" and 4''', the outer partial pipe sections 5" and 5''' and the partial flanks 6" and 6''', and 7" and 7''', respectively, rest on each other as seen in FIG. 9. Further, the inner partial pipe section 4' extends so as to pass into the adjoining inner pipe section 4 without any serious irregularity at the transition section 11. Correspondingly, the outer partial pipe portion 5" does not exhibit any serious radial irregularity towards the partial pipe portion 5 at the transition section 14. This corrugated pipe 1" has an inside diameter i of the inner pipe sections 4 and of the inner partial pipe section 4''', respectively, and an inside diameter j of the outer pipe portion 5 and the outer partial pipe section 5", respectively, which are each smaller than the inside diameters f or f' and e or e'. The results from the fact that the corrugated pipe 1 is pushed together to form the corrugated pipe 1" in the vicinity of the corrugated partial sections 3" and 3'''.

Manufacturing the corrugated pipe 1 and subsequently the corrugated pipe 1" takes place on an installation as diagrammatically illustrated in FIG. 10. Such an installation comprises an extruder 18, from the pipe extrusion head 19 of which is extruded a tube 20 of thermoplastic plastics.

As seen in FIG. 11, the pipe extrusion head 19 comprises a die 21 with an axis that coincides with the axis 2 and a mandrel 22 concentrically disposed in the die 21, a die gap 23 being formed between the die 21 and the mandrel 22, in which the tube 20 is molded.

A sliding or damming beam 24 can be disposed in the die 21, which can be pushed into the die gap 23 for an area 25 to form there, of which the radial extension k is smaller radially to the axis 2 than the radial extension 1 of the die gap 23 in the other areas. In this area 25, the die gap 23 is narrower than in the other area so that the tube 20 extruded in this area from the extrusion head 19 has a wall thickness that is inferior to that of the other area. The sliding and damming beam 24 is fixed to the die 21 by means of screws 26. Its radial distance from the axis 2 and thus the width in the area 25 of the die gap 23 is set by means of adjusting screws 27. Fundamentally, a narrowed area 25 can also be obtained through non-symmetrical arrangement of the die 21 relative to the mandrel 24 instead of the use of a sliding and damming beam 24.

In an downstream molding machine 28, the tube 20 is shaped into a corrugated pipe 1 by so-called vacuum treatment or by so-called blow molding or by a combined vacuum treatment and blow molding method. Molding machines 28 of the generic type are generally known from German patent 12 03 940 and 12 11 789 (corresponding to British patent 971 021). The corrugated pipe 1, which is already inherently stable, leaves the molding machine 28. The part of the tube 20 that has been molded in the area 25 of the extrusion die 21 is shaped into the area of the corrugated pipe 1 that comprises the corrugated sections 3'.

This corrugated pipe 1 is further cooled in a downstream cooling bath 29 by means of an appropriate coolant 30 directed at the corrugated pipe 1 by nozzles 31 which are only roughly outlined. This may be air or water. Cooling baths 29 of this type are known and general practice.

A belt or Caterpillar delivery mechanism 32 is disposed downstream of the cooling bath 29, by means of which the corrugated pipe 1 is conveyed in the direction of production 33. Belt or Caterpillar delivery mechanisms 32 of this type are also known and general practice. This delivery mechanism 32 is also provided with a cutting device.

The cutting device substantially consists of a knife 34, by means of which the corrugated pipe 1 is slit lengthwise in the cutting plane 17. Since the belt and Caterpillar delivery mechanism 32 is otherwise known and general practice, the delivery belts 35 are only diagrammatically outlined.

Figure 12:
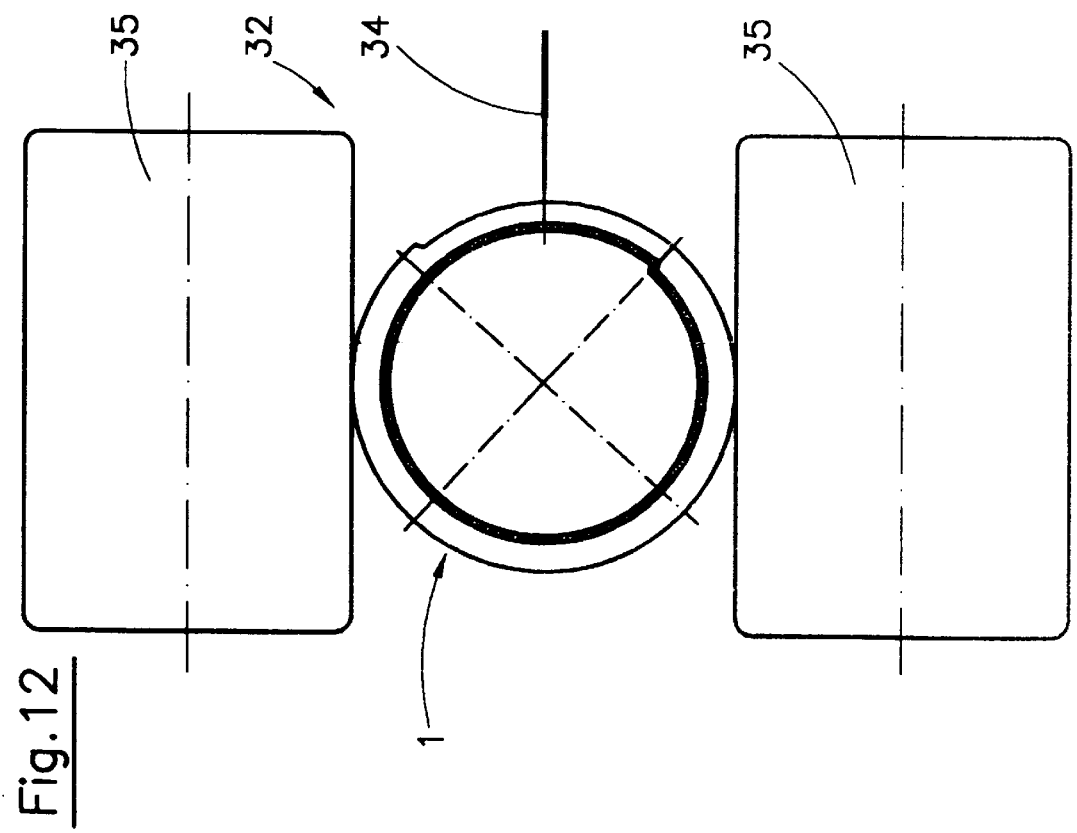
FIG. 12 is a section through a delivery mechanism corresponding to the section line XII of FIG. 10.

In the direction of production 33, the delivery mechanism 32 is followed by a postforming device 36, in which heaters 37 are provided, by means of which the corrugated pipe 1 is heated to a temperature appropriate for thermal postforming. In the postforming device 36, provision is made for shaping rolls 38, 39 which have axes 40, 41 that run at right angles to the central longitudinal axis 2 of the corrugated pipe 1. Further, they have concave surfaces 42, 43 which are arched inwards towards the respective axis 40 and 41 and by means of which the corrugated pipe 1 slit in the cutting plane 17 is shaped from its original form seen in FIGS. 1, 2 and 12 into the corrugated pipe 1" of FIGS. 7 and 8, by substantially the corrugated sections 3 being forced together so that the corrugated partial sections 3" and 3'" reach into each other as described above. The corrugated pipe 1" is then rolled up on a customary coiling device 44.

The finished corrugated pipe 1" as seen in FIGS. 7 and 8 serves as an enveloping corrugated pipe for electric lines 45 or the like, some of which are illustrated in FIG. 8. The lines 45 to be inserted into such a corrugated pipe 1", inclusive of the plug-type connectors, are prepositioned on assembly boards. When all the lines 45 are prepositioned, then the respective corrugated pipe 1" is opened approximately radially to the axis 2 in the vicinity of the corrugated partial sections 3" and 3'" by means of corresponding mounting aids and slipped over the strand of lines 45. Then the corrugated pipe 1" is again closed due to the elastic restoring forces. The lines 45 are protected against splash water in the corrugated pipe 1". Because of the reduced wall thickness a', b', d' in the vicinity of the corrugated partial sections 3" and 3'", the corrugated pipe 1" has no or only a negligible preferred bending direction. Further, the inner partial pipe section 4" passing flush into the inner pipe section 4 according to the illustration of FIG. 8 serves to avoid sharp edges on the interior wall of the corrugated pipe 1". The corrugated pipe 1" itself is one-piece. Due to the good overlapping and the close contact, subsequent, for instance ultrasonic, welding of the slit corrugated pipe is conceivable. In this way, durable fastening can be attained also after the assembly, with only spot welding taking place. A prerequisite is of course the weldability of the plastic material used.

What is claimed is:

1. A one-piece enveloping corrugated pipe, comprising
a central longitudinal axis (2),
a periphery,
corrugated sections (3), which are disposed one after the other in the direction of the axis (2), which are contiguous to each other and extend over more than half the periphery, each of said corrugated sections (3) comprising
an outer pipe portion (5),
an inner pipe section (4),
flanks (6, 7), which connect said outer pipe portion (5) with two inner pipe sections (4) adjacent to said outer pipe portion (5) in the direction of the axis (2), and two ends (9, 10) turned towards each other,
one corrugated partial section (3", 3'") at a time formed on each end (9, 10) of a corrugated section (3) and comprising
an outer partial pipe portion (5", 5'"),
an inner partial pipe section (4", 4'"), and
partial flanks (6", 6'"; 7", 7'"), which connect said outer partial pipe portion (5", 5'"") with two inner partial pipe sections (4", 4'") adjacent to said outer partial pipe portion (5", 5'"") in the direction of the axis (2),
wherein
the two corrugated partial sections (3", 3'") allocated to a corrugated section (3) are disposed radially to the axis (2) one upon the other and engage with each other,
wherein the inner partial pipe section (4'") of the corrugated partial section (3'") disposed radially inwards is contiguous to, and flush with, the inner pipe section (4) of the corrugated section (3) at a transition (11) where the radially outer corrugated partial section (3") passes into the corrugated section (3), and
wherein the inner partial pipe section (4") of the radially outer corrugated partial section (3") is displaced radially outwards relative to the inner pipe section (4) at the transition (11) into the corrugated section (3).

2. An enveloping corrugated pipe according to claim 1, wherein the wall thickness a', b', d' of the corrugated partial sections (3", 3'") is less than the wall thickness a, b, d of the corrugated sections (3).

3. An enveloping corrugated pipe according to claim 1, wherein the corrugated partial section (3") disposed radially outwards has its greatest extension in the direction of the axis (2) where it passes into the corrugated section (3), and wherein the corrugated partial section (3'") disposed radially inwards has its lowest extension in the direction of the axis (2) where it passes into the corrugated section (3).

4. An enveloping corrugated pipe according to claim 1, wherein the outer partial pipe portion (5") of the corrugated partial section (3") disposed radially outwards is contiguous to, and flush with, the outer pipe portion (5) of the corrugated section (3) at the transition (14) where the radially inner corrugated partial section (3'") passes into the corrugated section (3), and wherein the outer partial pipe section (5") of the radially outer corrugated partial section (3") is displaced radially inwards at the transition (14) to the corrugated section (3).

5. An enveloping corrugated pipe according to claim 3, wherein the radially outer corrugated partial section (3"), where passing into the corrugated section (3), has a greater extension (k) in the direction of the axis (2) than the corrugated partial section (3), and wherein the radially inner corrugated partial section (3'"), where passing into the corrugated section (3), has an inner extension (h) in the direction of the axis (2) which is smaller than that of the corrugated section (3).

* * * * *